March 5, 1968 L. T. AKELEY 3,371,534
LEVEL SENSING APPARATUS
Filed May 10, 1966 2 Sheets-Sheet 1

INVENTOR.
LLOYD T. AKELEY
BY David E. Hopper
ATTORNEY

INVENTOR.
LLOYD T. AKELEY

_United States Patent Office_

3,371,534
Patented Mar. 5, 1968

3,371,534
LEVEL SENSING APPARATUS
Lloyd T. Akeley, Sharon, Mass., assignor to The Foxboro Company, Foxboro, Mass., a corporation of Massachusetts
Filed May 10, 1966, Ser. No. 549,025
2 Claims. (Cl. 73—299)

ABSTRACT OF THE DISCLOSURE

A tank level measuring system combines a static pressure measurement from the tank with a head level measurement in order to compute the level indication; the static pressure measurement is characterized to reduce the inherent error in such a system.

---

Figure 1:
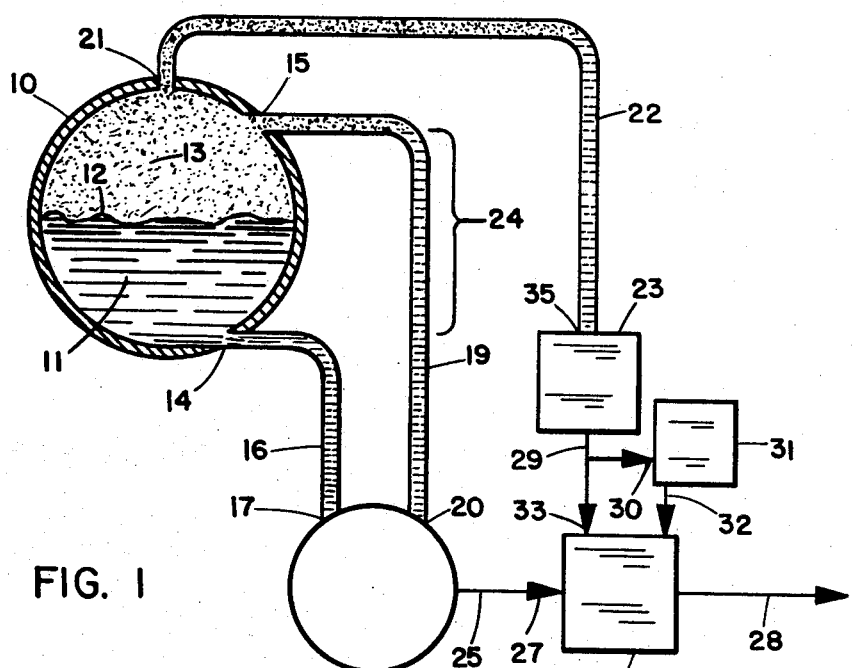

This invention relates to level measuring systems, and more particularly to level sensing systems employing pressure responsive transducers.

The use of pressure responsive transducers for monitoring the level of a liquid in a closed tank operating under conditions of elevated head and pressure offers several advantages. Moving components and mechanical linkages within the tank are not required, and the only connection to the level measuring system needed is piping from pressure taps in the tank.

If the tank were always vented to atmosphere, the gauge pressure reading from a pressure tap in the tank would be proportional to the level of the liquid above the tap. In a tank having a pressure therein elevated above atmospheric pressure, a single tap for level measurement within the tank would not only read the liquid head owing to the head of the liquid above the tap, but would additionally indicate the static tank pressure. In order to effectively cancel the pressure effect within a pressurized tank, a dual pressure tap system is employed. Two taps are located at different elevations with respect to the tank; a first tap is located sufficiently close to the tank bottom to read the lowest required indication of the liquid level which will then be zero when the liquid level coincides with the bottom tap; the higher tap is positioned sufficiently above the lower tap to indicate the highest required reading of liquid level. Together the two taps define the maximum range of liquid level reading, that is to say, a range of zero to 100% which does not necessarily coincide with the capacity of the tank. With this arrangement, the static pressure arising from the pressurized liquid vapor will be equally distributed to both taps. If, as is common practice, conduits from both taps lead downward beneath the tank to a differential pressure responsive apparatus, and both legs are filled to their respective tap level with the liquid of the tank, and if the fluid density is uniform throughout, there will be no differential pressure difference when the liquid level within the tank coincides with the topmost tap. When the level of the liquid coincides with the bottom tap, the differential pressure responsive apparatus will read the difference between the weight of the liquid in that portion of the conduit leading to the topmost tap which is vertical between the bottom and the top taps (the reference leg) and the vapor head over the bottom tap. The reference leg head determines the zero or empty reading of the level measurement system.

Such a measurement system for a pressurized tank will work well as long as the pressure and temperature remain constant inasmuch as the fluid density thus is also constant. If the level is to be monitored within a tank over a wide range of varying pressure and temperature, the measurement will be affected by the changes in liquid and vapor density occasioned by the change in pressure and the temperature.

In a tank containing saturated steam and water, as temperature and pressure increase the water density decreases and the steam density increases. For level indication using pressure responsive transducers, means for compensating these changes is required.

Accordingly, this invention is directed to means for compensating a differential pressure level measurement in a pressurized vessel in order to provide an accurate representation of the liquid level regardless of pressure. Inasmuch as the differential pressure measurement is a function of both level and pressure, it is desired to eliminate the contribution of the pressure change so that the final measurement is proportional only to the level.

It is an object of this invention to provide level indication in a pressurized tank that is accurate over the entire operating range of the pressures.

It is another object of this invention to provide a level indication system including compensation for a changing operating pressure in a closed tank so that the effects of change in pressure and temperature are cancelled.

It is another object of this invention to provide a pressure compensated level indication such that the indicating system can easily be adjusted to read zero and 100% corresponding to any two chosen reference levels between two taps in a tank as well as accurately indicating level at points between zero and 100 percent.

It is another object of this invention to provide means for providing an accurate input to a level controller of a pressurized tank that will be valid regardless of the operating conditions of the tank.

Figure 2:
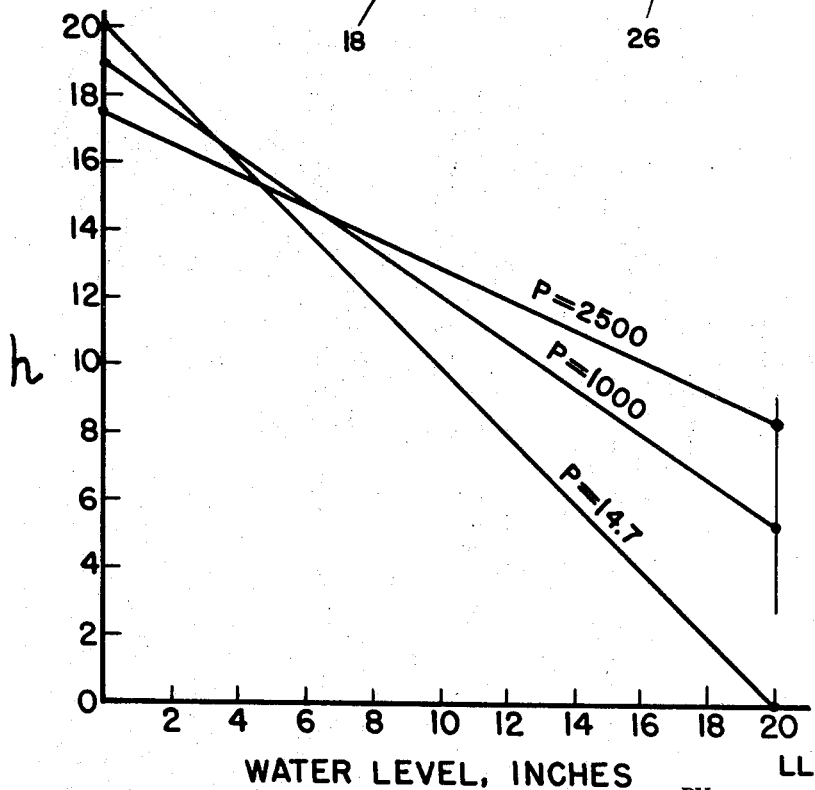
Figure 3:
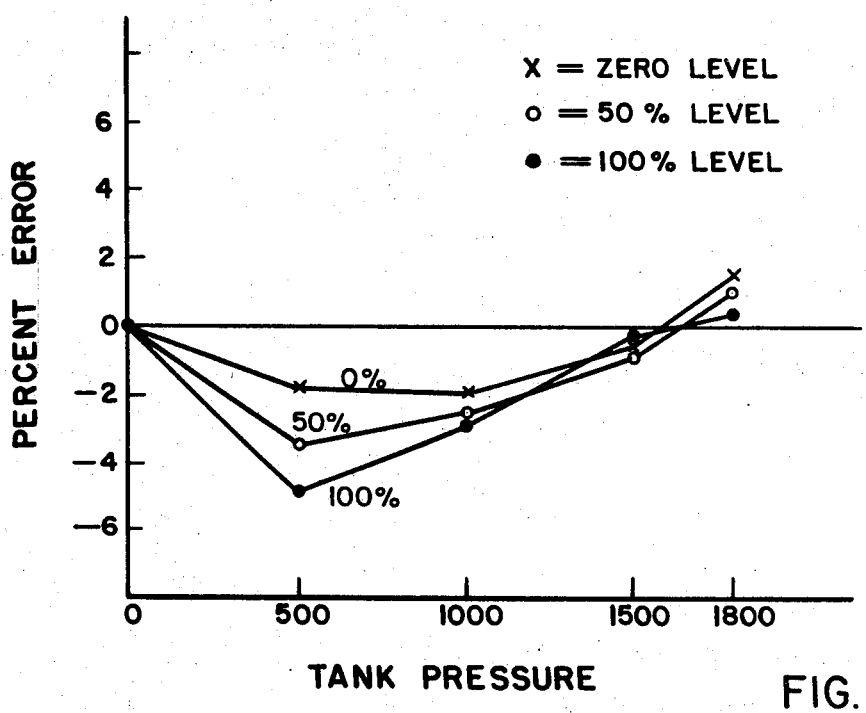

Other objects and advantages of this invention will be in part pointed out and in part apparent from the following description taken together with the accompanying figures, in which:

FIGURE 1 is an embodiment of the invention in block diagram form showing a differential pressure responsive and pressure compensated level sensing system; and FIGURE 2 is a graph showing the relationship between water level and differential pressure for several operating pressures within a closed tank; and FIGURE 3 is a graph showing the percent error for level indication with respect to a range of tank pressures when the tank pressure is uncharacterized in the pressure compensation computation.

Referring to FIGURE 1, closed tank 10 contains water 11 having a surface level 12. The remaining interior of the vessel 10 above surface level 12 is filled by pressurized saturated steam 13. Pressure tap 14 is located near the bottom of vessel 10 and is responsive to the combination of the liquid head above tap 14 and the vapor head above surface 12, as well as the static tank pressure. Pressure tap 15 is located near the top of vessel 10, and is elevated with respect to pressure tap 14, and is responsive to the static tank pressure and any vapor head above tap 15. Conduit 16 connects tap 14 in a downwardly direction to input 17 of differential pressure sensing device 18, which is located beneath tank 10. Conduit 19 connects tap 15 in a downwardly direction to input 20 of differential pressure sensing device 18. Conduits 16 and 19 run the same for vertical distance except for portion 24 of conduit 19 running vertically the distance between pressure taps 14 and 15. Section 24 is designated the reference leg.

The pressure appearing at input 17 of differential pressure sensing device 18 consists of the sum of the following: the head owing to the vertical length of conduit 16 between input 17 and pressure tap 14; the head of liquid 11 from tap 14 to level 12; the head due to the vertical height of steam above surface level 12; and the static pressure within pressurized tank 10.

The pressure appearing at input 20 of differential pressure sensing device 18 consists of the sum of the following:

the head owing to the vertical height of the liquid in conduit 19 between input 20 and pressure tap 15; the static pressure within tank 10; plus any steam head above tap 15. Water 11 is assumed to be at boiling temperature according to the tank static pressure, and the full height of conduit 19 will be full of water condensate inasmuch as conduit 19 is external to the highly heated environment of pressurized tank 10.

As the static pressure within tank 10 is evenly distributed throughout, the pressure difference sensed between inputs 17 and 20 at differential pressure sensing device 18 does not include this static pressure. So too, the head in conduit 16 is equal to the head in that portion of conduit 19 from input 20 ending at the level of tap 14, at the beginning of reference leg 24 if both conduits 16 and 19 are at the same temperature; therefore, these heads cancel at inputs 17 and 20 of device 18. Therefore, differential pressure measuring device 18 will sense the difference in head between reference leg 24 on one hand and the head attributable to the combination of water level 12 and steam 13 head on the other hand. In operation, any head at input 17 of differential pressure sensing device 18 will be equal to or less than the head at input 20.

The differential pressure between inputs 17 and 20 may be designated by the symbol $h$. At a given pressure, the magnitude of $h$ will be inversely proportional to the height of level 12 above tap 14; $h$ is a minimum when level 12 is 100% (at tap 15) and $h$ is a maximum when level 12 is zero (at tap 14). FIGURE 2 shows this relationship of $h$ to level 12.

The characteristic performance of differential pressure sensing device 18 is to produce an output 25 proportional to the difference in pressure between inputs 17 and 20 thereof when input 17 is greater than input 20. Inasmuch as it is desired to obtain an output 25 proportional to level 12 within the tank 10, it is convenient to adjust device 18 so that minimum output 25 represents zero level and maximum output 25 represents 100% level. Therefore, device 18 is biased to read 100° output at 25 when $h$ is zero. Connecting the high side of $h$ (conduit 19) to the "low" input 20 and the low side of $h$ (conduit 16) to the "high" input effectively inverts $h$ and thus as $h$ decreases, output 25 increases.

Referring to FIGURE 2 and the line $P=14.7$ showing $h$ level relationship under static tank pressure of 14.7-pounds per square inch (atmospheric), at tank level zero, $h=20$-inches of water pressure difference and output 25 is zero; at level 100%, $h=0$-inches of water pressure difference and output 25 is 100 percent. Device 18 is also calibrated so that its output 25 indicates level 12 for tank static pressure equal to atmospheric pressure.

The graph shown in FIGURE 2 illustrates the relationship between level 12 and the head differential $h$ between inputs 17–20 of device 18 for a number of tank 10 pressures, when the vertical distance between taps 14 and 15 is 20-inches.

At a pressure of 2500-pounds per square inch within tank 10, at a level of 100% the differential pressure $h$ is about 8.7-inches of water; the change from $h$ equal to zero inches of water for a full tank at atmospheric pressure can be attributed to the decrease in density of the water within the tank at the increased pressure and increased temperature for saturated steam and water boiling conditions.

At a pressure of 2500-pounds per square inch, at zero level differential pressure $h$ is about 17.5-inches of water; the loss of 2.5-inches from the case of 20-inches of water at atmospheric pressure for the empty tank can be attributed to the increased density of the compressed vapor 13 at this increased pressure and temperature.

The graph shown in FIGURE 2 shows the effect of a decreasing water density coupled with an increasing water vapor density as the tank static pressure increases from 14.7 to pressures of 1000 and 2500-pounds per square inch. It can be seen that at about 25% tank level, the effects tends to balance, and that the differential pressure at inputs 17 and 20 corresponding to a 25% level tends to be independent of pressure variations. Also, it may be noted that at any one pressure, $h$ is inversely proportional to level.

In order to obtain a level indication independent of tank pressure, output 25 of differential pressure measuring device 18 must be modified. Output 25 is proportional to level, but in addition is affected by pressure as indicated in FIGURE 2. Output 25 can be corrected by a function of pressure so as to be proportional to level only. Output 25 is processed by computer 26 to produce a computed level indication 28 according to the formula:

$$\text{Level indication } 28 = k_1 h + k_2 h P - k_3 P$$

thereby giving a pressure-compensated level indication 28 which is also suitable as an input for a tank level control system.

In the above formula, constant $k_1$ establishes the relationship between output 28 and input 27 at tank pressure $P$ equal to atmospheric. Input 27 to computer 26 is output 25 of differential pressure transmitter 18 and output 25 is a function of differential pressure input $h$ to device 18. Thus, at $P=14.7$, output $28=k_1 h$. Constant $k_2$ is a multiplying coefficient which compensates for the reduced $h$ input to device 18 as tank pressure $P$ increases so that change in output 28 remains proportional to change in tank level from 0–100% level for all tank operating pressures. Constant $k_3$ is the zero compensation coefficient and is adjusted to make level indication 28 for an empty tank read zero at a selected elevated pressure. It follows, if $k_2$ multiplying coefficient has been properly chosen to provide the proper span, that output 28 will be 100% when level is 100% and thus will be proportional to level at all levels.

Referring to FIGURE 1, static tank pressure $P$ is taken from a tap 21 conveniently located near the top of tank 10 and supplied through conduit 22 to input 35 of pressure transmitter 23. Output 29 of pressure transmitter 23 is a linear function of $P$. Output 29 is supplied to input 33 of computer 26, supplying the $P$ term thereto.

FIGURE 3 shows typical tank level indication error curves using a linear analog computer to perform the functions shown in the above equation. Coefficient $k_3$ is chosen to provide proper zero compensation at a rated tank pressure, illustratively 1600-pounds per square inch. Note that the error is negligible at both zero and rated tank pressure. At intermediate pressures, error departs somewhat from zero because $k_3$ coefficient is exactly correct only at rated pressure and over-compensates at lower pressures. Characterizing the $k_3$ coefficient by making it a non-linear function of pressure will further reduce level indication errors. This characterization may be performed by device 31 shown in FIGURE 1 which has an input 30 taken from output 29 of pressure transmitter 23, which is a linear function of tank pressure $P$. Device 31 suitably characterizes this input and produces output 32 which is a non-linear function of tank pressure $P$. Output 32 is shown in FIGURE 1 as an input to computer 26 to provide the $k_3 P$ term of the formula. It will further reduce level errors as shown in FIGURE 3 by reducing the zero compensation at pressure below rated pressure and increase zero compensation above rated pressure.

It is convenient and economical to employ a pressure-operated characterizable potentiometer in place of characterizer 31 for providing output 32 to computer 26. The potentiometer taper may be adjusted to produce an effective $k_3$ term suitably changing with static tank pressure so as to reduce the level indication error shown in the graph of FIGURE 3 to a minimum. Such a potentiometer may be directly operated by the tank pressure.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. Apparatus for indicating liquid level in a pressurized system containing water and saturated steam comprising:

differential pressure sensing means having a first input responsive to pressure from a selected first height in said system and having a second input responsive to pressure from a selected second height in said system vertically displaced from said first height and having a differential pressure output signal related to the difference in pressure between said first and said second inputs, static pressure sensing means responsive to the static pressure within said pressurized system having a static pressure output signal related to said static pressure, computation means responsive to said differential pressure output signal and responsive to said static pressure output signal and computing an output representing liquid level having a variable ratio to said differential pressure output signal wherein said ratio is varied in relation to said static pressure output signal and said output representing liquid level having a variable zero bias varied in relation to said static pressure output signal whereby said output representing liquid level is compensated for changing conditions within said pressurized system, and means for characterizing such static pressure output signal so that the computation of the compensated zero by said computation means produces an overall accurate output representing liquid level.

2. The apparatus for indicating liquid level of claim 1 wherein said variable ratio is varied in proportion to said static pressure output signal and said static pressure output signal is suitably characterized prior to co-operating in the computation of the zero bias contribution to the output representing liquid level so that level indication is accurate throughout the range of system pressures.

References Cited

UNITED STATES PATENTS 2,791,906   5/1957   Vetter ---------- 73—299 XR

LOUIS R. PRINCE, *Primary Examiner.*

D. O. WOODIEL, *Assistant Examiner.*